(12) United States Patent
Matsumoto et al.

(10) Patent No.: US 8,928,915 B2
(45) Date of Patent: Jan. 6, 2015

(54) IMAGE COMMUNICATION APPARATUS

(75) Inventors: Daisuke Matsumoto, Nagoya (JP);
Shozo Kabeya, Gamagori (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 193 days.

(21) Appl. No.: 13/362,541

(22) Filed: Jan. 31, 2012

(65) Prior Publication Data
US 2012/0243040 A1 Sep. 27, 2012

(30) Foreign Application Priority Data

Mar. 24, 2011 (JP) ................................ 2011-065710

(51) Int. Cl.
*G06F 3/12* (2006.01)
*G06F 15/00* (2006.01)
*G06K 15/00* (2006.01)
*G06K 1/00* (2006.01)
*H04N 1/00* (2006.01)
*H04N 1/32* (2006.01)

(52) U.S. Cl.
CPC ....... *H04N 1/00244* (2013.01); *H04N 1/32117* (2013.01); *H04N 2201/325* (2013.01); *H04N 2201/0039* (2013.01); *H04N 2201/0094* (2013.01); *H04N 2201/3278* (2013.01)
USPC .......... 358/1.15; 358/1.14; 358/1.16; 358/1.9

(58) Field of Classification Search
None
See application file for complete search history.

(56) References Cited

U.S. PATENT DOCUMENTS 7,296,059 B2    11/2007   Fujiwara
7,391,743 B2 *    6/2008   Momozono et al. .......... 370/254
(Continued)

FOREIGN PATENT DOCUMENTS

JP    06-217069 A    8/1994
JP    08-154164    6/1996
(Continued)

OTHER PUBLICATIONS

Japanese Official Action dated Feb. 5, 2013 together with English translation from related application 2011-065710.

*Primary Examiner* — Satwant Singh
(74) *Attorney, Agent, or Firm* — Scully, Scott, Murphy & Presser, PC

(57) ABSTRACT

An image communication apparatus configured to communicate with a server on a network, and configured to communicate with at least one external apparatus through a public network, includes: a destination receiving unit receiving a designation of a destination;
a reading unit reading a document; a first generating unit generating first image data based on the document read by the reading unit; a first transmitting unit transmitting the first image data generated by the first generating unit to the server; a transmission-data generating unit generating transmission data including access information and second image data having a smaller amount of data than that of the first image data, the access information being for acquiring the first image data from the server, and a second transmitting unit configured to transmit the transmission data generated by the transmission-data generating unit, to the destination through the public network.

10 Claims, 12 Drawing Sheets

(56) References Cited

U.S. PATENT DOCUMENTS

| | | | |
|---|---|---|---|
| 7,545,992 B2* | 6/2009 | Kato et al. | 382/239 |
| 7,684,077 B2* | 3/2010 | Maeda | 358/1.18 |
| 7,880,924 B2* | 2/2011 | Lowman et al. | 358/1.9 |
| 8,248,635 B2* | 8/2012 | Hosoda | 358/1.15 |
| 8,248,646 B2 | 8/2012 | Ando | |
| 8,259,328 B2* | 9/2012 | Shobu | 358/1.15 |
| 2002/0133543 A1 | 9/2002 | Fujiwara | |
| 2004/0027601 A1 | 2/2004 | Ito et al. | |
| 2005/0094178 A1* | 5/2005 | Anno | 358/1.13 |
| 2009/0109470 A1* | 4/2009 | Tsutsumi | 358/1.15 |
| 2009/0244612 A1 | 10/2009 | Ando | |
| 2010/0002268 A1 | 1/2010 | Sawano | |
| 2010/0053687 A1* | 3/2010 | Matsuda | 358/3.24 |
| 2010/0177352 A1* | 7/2010 | Anno | 358/1.15 |
| 2010/0182640 A1* | 7/2010 | Daigo | 358/1.15 |
| 2011/0019216 A1* | 1/2011 | Kataoka et al. | 358/1.13 |
| 2011/0102843 A1* | 5/2011 | Yoshida et al. | 358/1.15 |
| 2011/0149332 A1* | 6/2011 | Cho | 358/1.14 |

FOREIGN PATENT DOCUMENTS

| | | |
|---|---|---|
| JP | 11-055438 | 2/1999 |
| JP | 2001-022660 A | 1/2001 |
| JP | 2001-339556 A | 12/2001 |
| JP | 2002-197439 A | 7/2002 |
| JP | 2002-269017 A | 9/2002 |
| JP | 2003-36200 A | 2/2003 |
| JP | 2003-37830 A | 2/2003 |
| JP | 2003-50920 A | 2/2003 |
| JP | 2003-289417 A | 10/2003 |
| JP | 2004-201040 | 7/2004 |
| JP | 2006-295750 A | 10/2006 |
| JP | 2007-28683 A | 2/2007 |
| JP | 2008-124677 A | 5/2008 |
| JP | 2009-017401 | 1/2009 |
| JP | 2009-246493 A | 10/2009 |

* cited by examiner

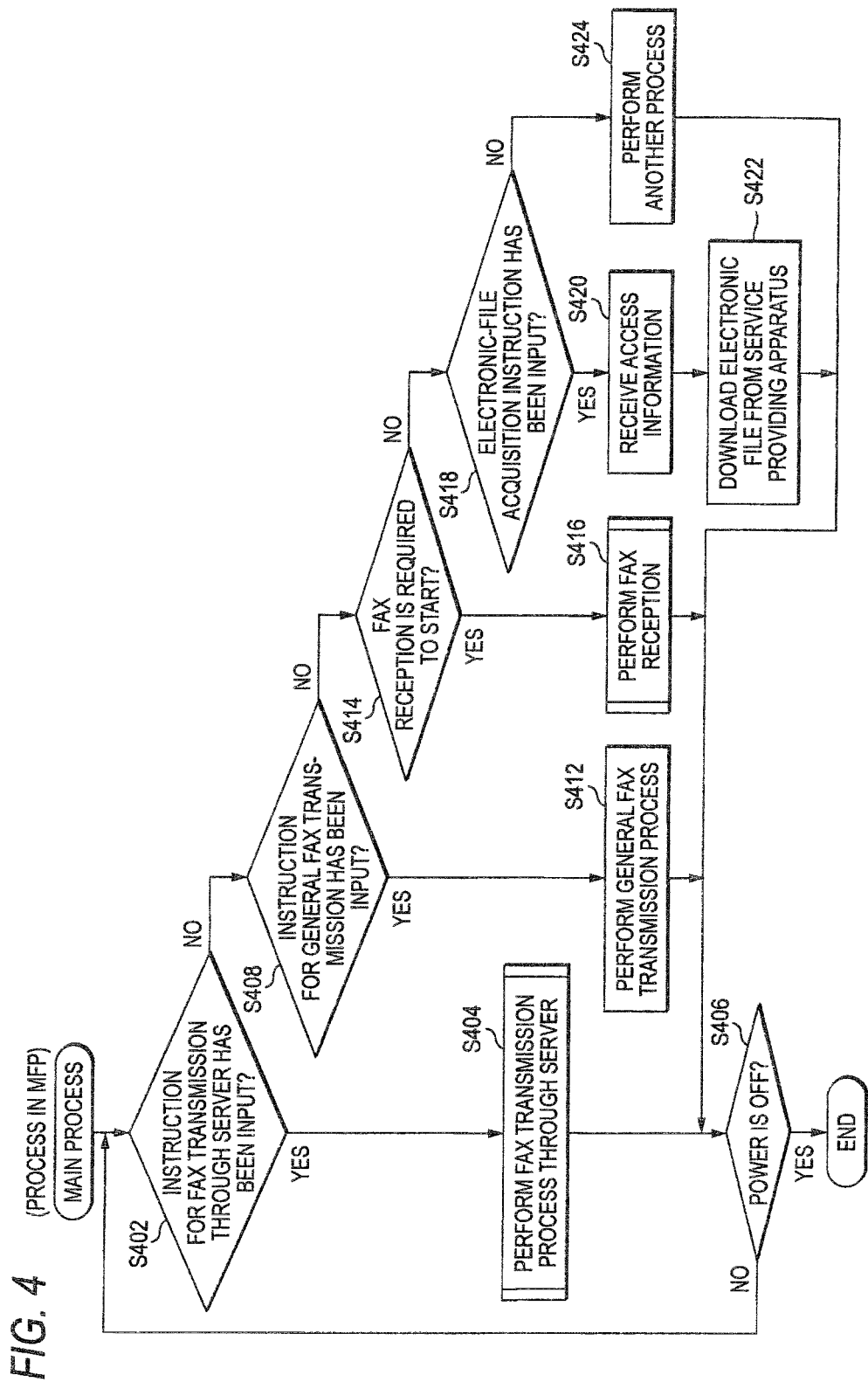

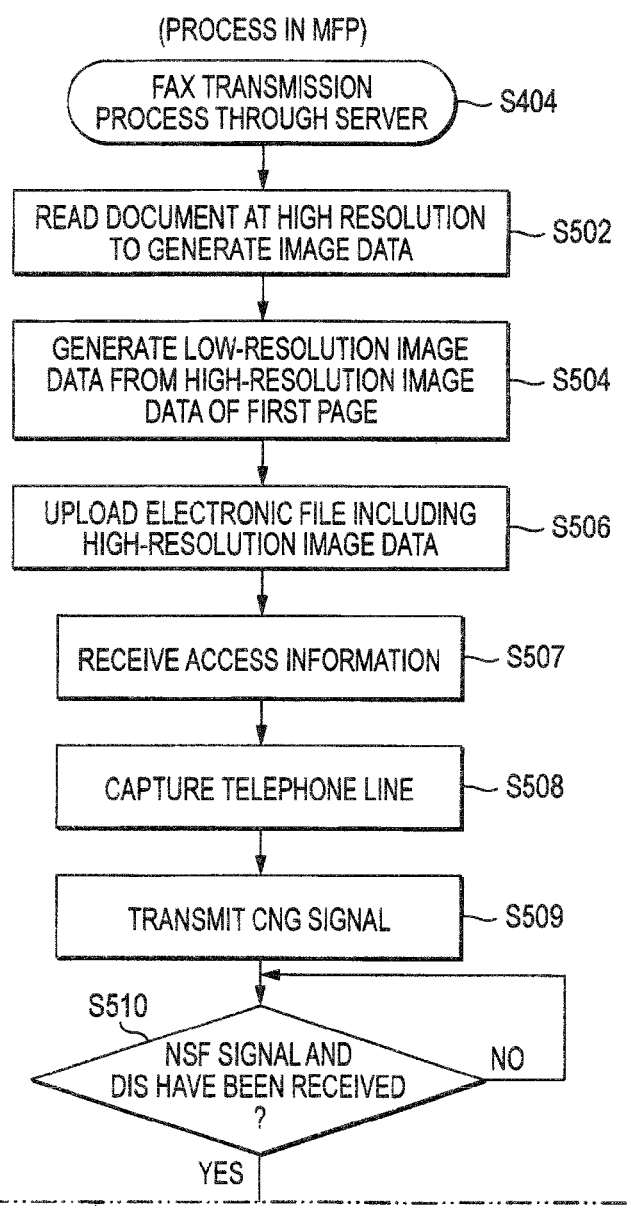

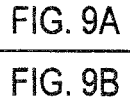
FIG. 9
| FIG. 9A |
| FIG. 9B |
*FIG. 9A*
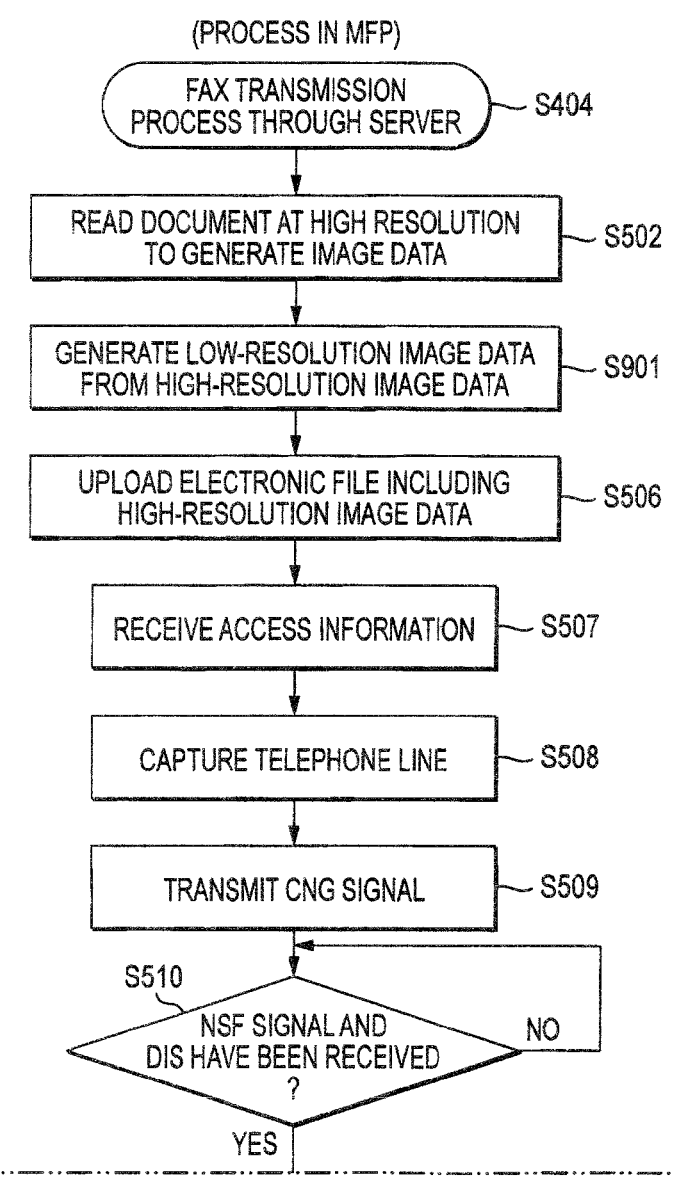

IMAGE COMMUNICATION APPARATUS

CROSS-REFERENCE TO RELATED APPLICATION

This application is based upon and claims the benefit of priority of Japanese Patent Application No. 2011-065710 filed on Mar. 24, 2011, the contents of which are incorporated herein by reference in its entirety.

BACKGROUND

The present disclosure relates to an image communication apparatus.

Japanese Patent Application Laid-Open No. 2009-17401 discloses an image communication apparatus which transmits a designated page of images of a plurality of pages through a public line, to a destination of a fax number designated by the user by fax transmission through a public line, and transmits the other pages to the destination of a mail address designated by the user, by Internet fax transmission. According to the technology disclosed in Japanese Patent Application No. 2009-17401, among images of a plurality of pages, the pages other than the page transmitted through the public line by the fax transmission are transmitted by fax transmission through an Internet line. Therefore, it is possible to reduce the cost of communication required for the fax transmission.

SUMMARY

However, according to the image communication apparatus disclosed in Japanese Patent Application No. 2009-17401, in a case of transmitting images of a plurality of pages to a destination, it is required to designate the fax number and mail address of the destination. Therefore, the user-friendliness is bad.

An aspect of the present disclosure was made for solving the above-mentioned problem, and an object is to provide an image communication apparatus capable of reducing the cost of communication while reducing workload on a user.

The aspect of the disclosure provides an image communication apparatus configured to communicate with a server on a network, and configured to communicate with at least one external apparatus through a public network, the image communication apparatus comprising:

a destination receiving unit configured to receive a designation of a destination;

a reading unit configured to read a document;

a first generating unit configured to generate first image data based on the document read by the reading unit;

a first transmitting unit configured to transmit the first image data generated by the first generating unit to the server;

a transmission-data generating unit configured to generate transmission data including access information and second image data having a smaller amount of data than that of the first image data, the access information being for acquiring the first image data from the server, and a second transmitting unit configured to transmit the transmission data generated by the transmission-data generating unit, to the destination received by the destination receiving unit, through the public network.

The aspect of the present disclosure can be implemented in various forms such as a control device for controlling an image communication apparatus, a program that is executable in an image communication apparatus, a record medium that records that program, an image communication method, and an image communication system.

BRIEF DESCRIPTION OF DRAWINGS

FIG. 4 is a flow chart illustrating a main process which is performed in the MFP.

FIGS. 5A and 5B are a flow chart illustrating a fax transmission process through a server, which is performed in the MFP.

FIGS. 9A and 9B are a flow chart illustrating a fax transmission process through a server according to a modification.

DESCRIPTION OF EXEMPLARY EMBODIMENTS

Figure 1:
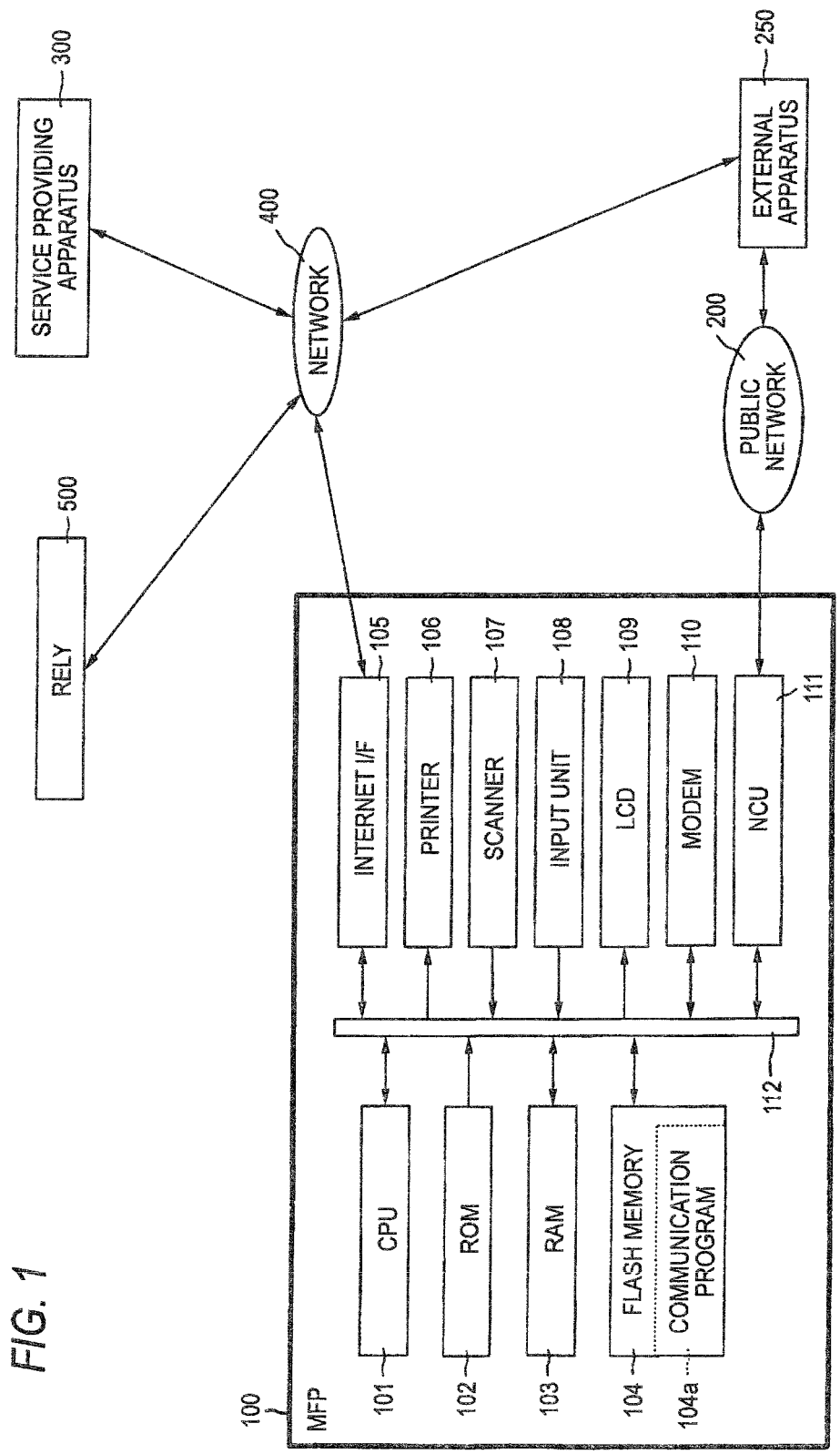
FIG. 1 is a block diagram schematically illustrating an electrical configuration of a multi-function peripheral (hereinafter, referred to as an MFP) according to an embodiment.

Hereinafter, an embodiment according to the aspect of the disclosure will be described with reference to the accompanying drawings. FIG. 1 is a block diagram schematically illustrating an electrical configuration of an MFP 100 which is an embodiment of an image communication apparatus. The MFP 100 is connected to a service providing apparatus 300 and a relay 500 through a network 400, so as to perform data communication with the service providing apparatus 300 and the relay 500. The network 400 may be composed of the Internet, for instance.

The MFP 100 is capable of communication with the service providing apparatus 300 and the relay 500 disposed on the network 400, and is capable of performing fax transmission and reception with respect to at least one external apparatus 250 through a public network 200. Particularly, the MFP 100 of the present embodiment transmits high-resolution image data to the service providing apparatus 300 such that the high-resolution image data is stored in the service providing apparatus 300. Meanwhile, the MFP 100 transmits access information to be used for acquiring the high-resolution image data from the service providing apparatus 300, to the external apparatus 250 through the public network 200, such that the external apparatus 250 receives the high-resolution image data. In this way, the MFP 100 is configured to be capable of reducing the cost of communication while suppressing workload on a user. Hereinafter, a detailed description will be made.

The MFP 100 mainly includes a CPU 101, a ROM 102, a RAM 103, a flash memory 104, an Internet interface (Internet I/F) 105, a printer 106, a scanner 107, an input unit 108, a liquid crystal display (LCD) 109, a modem 110, a network control unit (NCU) 111, which are connected to one another through bus lines 112.

The CPU 101 performs processes in accordance with programs stored in the ROM 102 and the flash memory 104. The ROM 102 is a memory that stores programs for controlling an operation of the MFP 100, fixed values, and so on. The RAM 103 temporarily stores information necessary for the processes of the CPU 101. The flash memory 104 is a rewritable non-volatile memory, and stores a communication program 104a, The CPU 101 performs a main process (to be described with reference to FIG. 4) in accordance with the communication program 104a.

The Internet I/F 105 is used for performing communication with another apparatus through the network 400, and can use a known network card. The printer 106 is an apparatus for printing images based on transmission data received from the external apparatus 250, and electronic files received from the service providing apparatus 300. The scanner 107 is an apparatus for reading documents. The input unit 108 may be composed of a numeric keypad for receiving a designation of a destination regarding fax transmission, or a touch panel for inputting instructions and information to the MFP 100.

The modem 110 modulates image data for fax transmission, so as to obtain a signal capable of being transmitted to the public network 200, and transmits the modulated signal through the NCU 111. Also, the modem 110 demodulates a signal received from the public network 200 through the NCU 111, so as to obtain image data. The NCU 111 connects the public network 200 and the MFP 100, and controls a connection state with the external apparatus 250 by closing or disconnecting a line.

For the purpose of the simplicity of the drawings, only one external apparatus 250 is shown in FIG. 1. However, there are a number of external apparatuses 250 capable of fax transmission and reception with respect to the MFP 100 through the public network 200. The external apparatus 250 may be the same model as the MFP 100, or be a model different from that of the MFP 100.

The service providing apparatus 300 is a Web server which is disposed by a service provider who provides an electronic-file storing service. The MFP 100 uses the electronic-file storing service, which is provided by the service providing apparatus 300, through the relay 500, and will be described below in detail with reference to FIG. 2.

The relay 500 is a device having a known server function, and has a service relay program (not shown) installed therein for relaying the communication between the MFP 100 and the service providing apparatus 300. The relay 500 generates an HTTP message using an API disclosed by the service provider, in accordance with the service relay program, transmits the HTTP message to the service providing apparatus 300, and receives data from the service providing apparatus 300 in response to the message transmission. Further, the relay 500 transmits the data received from the service providing apparatus 300, to the MFP 100.

Figure 2:
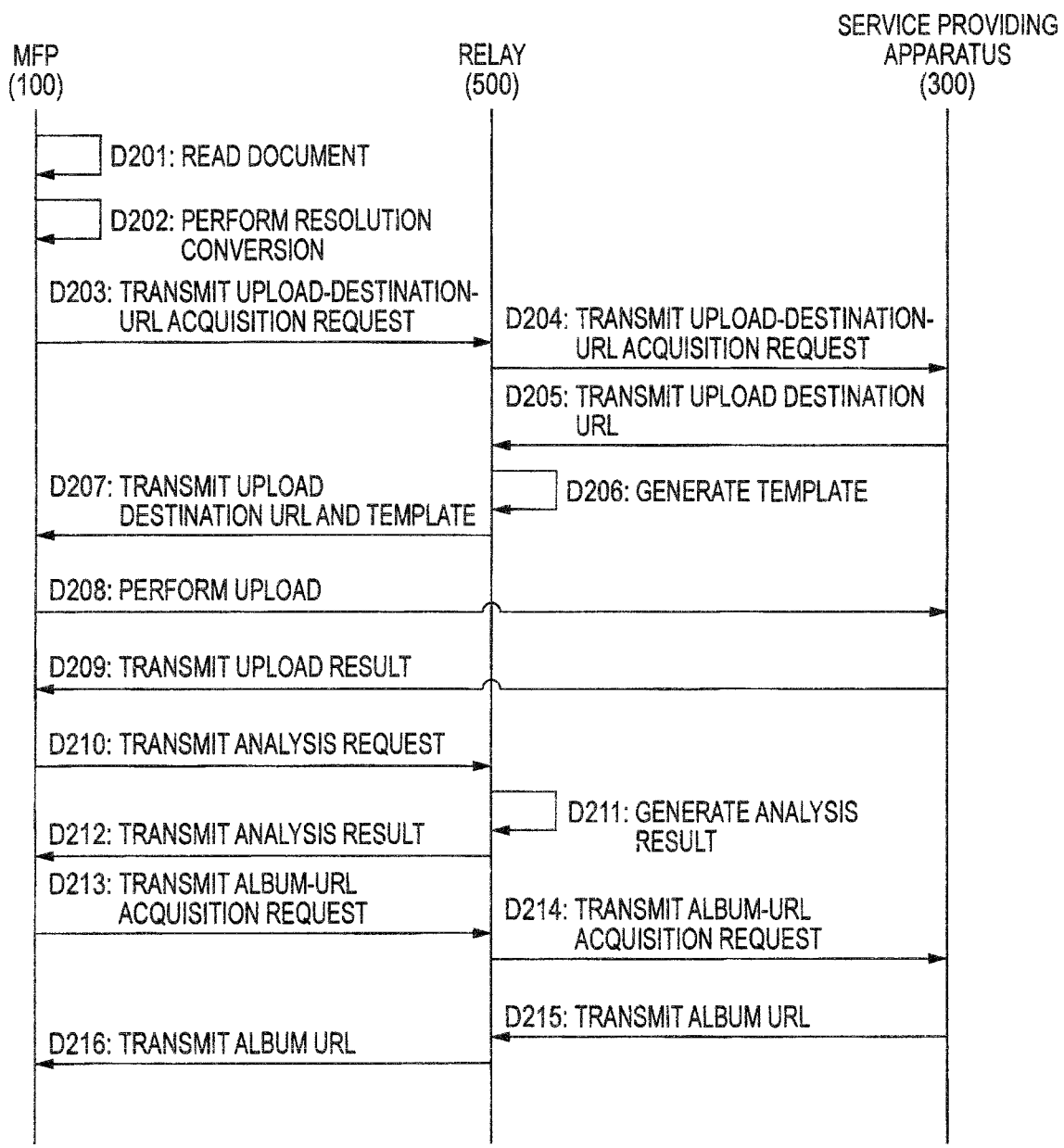
FIG. 2 is a sequence chart illustrating information flows among the MFP, a relay, and a service providing apparatus when the MFP uploads an electric file to the service providing apparatus.

FIG. 2 is a sequence chart illustrating information flows among the MFP 100, the relay 500, and the service providing apparatus 300 when the MFP 100 uploads an electronic file to the service providing apparatus 300.

First, in STEP D201, the MFP 100 reads a document by the scanner 107, so as to generate image data at a high resolution (for example, 600 by 600 dpi). Then, in STEP D202, the MFP 100 generates image data at a resolution (for example, 200 by 100 dpi) lower than that of the high-resolution image data, from the generated high-resolution image data. In STEP D202 is preferable to generate image data at the lowest resolution within a range enabling the contents of the image data to be visibly recognized in a print result. Further, in STEP D202, it is preferable to generate image data at a resolution lower than that of image data which is transmitted by general fax transmission. This is because, according to a fax transmission process through a server (FIG. 5) of the present embodiment, it is possible to use the service providing apparatus 300 to make a receiving side acquire high-resolution image data, as described below.

Next, in STEP D203, the MFP 100 transmits an upload-destination-URL acquisition request which is an HTTP message, to the relay 500. If receiving the upload-destination-URL acquisition request, in STEP D204, the relay 500 transmits an upload-destination-URL acquisition request to the service providing apparatus 300. The relay 500 generates the upload-destination-URL acquisition request using the API disclosed by the service provider of the service providing apparatus 300, and transmits the upload-destination-URL acquisition request to the service providing apparatus 300. If receiving the request from the relay 500, in STEP D205, the service providing apparatus 300 transmits an upload destination URL to the relay 500.

Next, in STEP D206, the relay 500 generates a template for an upload message for performing a request for upload to the service providing apparatus 300. Then, in STEP D207, the relay 500 transmits the template and the upload destination URL to the MFP 100. Specifically, the upload message is an HTTP request message. The kinds and number of items of information which is included in a header and a request body of the upload message depend on each service. According to the present embodiment, since the relay 500 generates the template for the upload message, the MFP 100 can generate an upload message in a format, which is requested by the service providing apparatus 300, in accordance with the template. The MFP 100 transmits an upload-destination-URL acquisition request for each document read in STEP D201, and acquires an upload destination URL for the corresponding document.

Next, the MFP 100 generates a JPEG-format electronic file including the high-resolution image data generated by reading the document, and stores the electronic file in the upload message. The MFP 100 stores one electronic file in one upload message. Next, in STEP D208, the MFP 100 uploads (transmits) the upload message to the service providing apparatus 300.

Meanwhile, the service providing apparatus 300 stores the electronic file in association with an album ID, in accordance with the upload message received from the MFP 100. In a case where a plurality of upload messages is uploaded from one MFP 100, the service providing apparatus 300 manages a plurality of electronic files included in the plurality of upload messages, in association with one album ID. Next, in STEP D209, the service providing apparatus 300 transmits an upload result representing that the upload has been completed, to the MFP 100. The upload result includes the album ID associated with the uploaded electronic file.

In STEP D210, the MFP 100 transmits the upload result to the relay 500, and in STEP D211, the relay 500 analyzes the upload result. Then, in STEP D212, the relay 500 transmits an analysis result to the MFP 100.

Next, in STEP D213, the MFP 100 transmits an album-URL acquisition request including the album ID to the relay 500, and in STEP D214, the relay 500 requests the album URL for acquiring the previously transmitted electronic file, from the service providing apparatus 300. Then, in STEP D215, the service providing apparatus 300 transmits the album URL to the relay 500, and in STEP D216, the relay 500 transmits the album URL to the MFP 100. The MFP 100 stores the received album URL as the access information in the RAM 103.

As described above, the MFP 100 uses the service providing apparatus 300 through the relay 500. Therefore, the MFP 100 may have no program for using the API disclosed by the service provider. The kind of the service and the API provided by the service providing apparatus 300 may be changed according to the circumstances of the service provider. This change can be handled by updating the service relay program in the relay 500. Therefore, it is possible to continuously use the service providing apparatus 300 even without making any change to the MFP 100.

Figure 3:
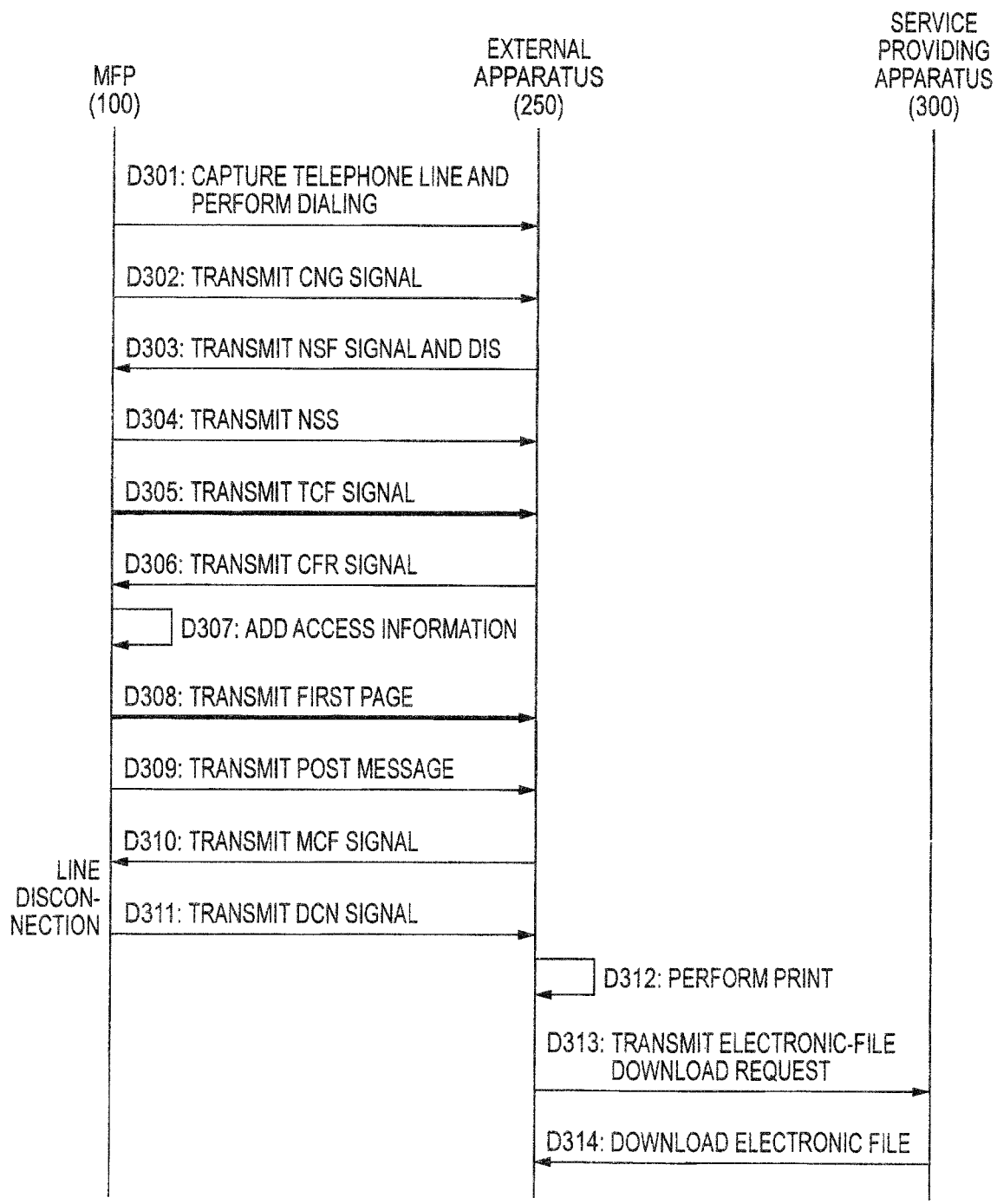
FIG. 3 is a sequence chart illustrating information flows among the MFP, an external apparatus, and the service providing apparatus when the MFP transmits access information to the external apparatus.

FIG. 3 is a sequence chart illustrating information flows among the MFP 100, the external apparatus 250, and the service providing apparatus 300 when the MFP 100 transmits the access information to the external apparatus 250. The communication between the MFP 100 and the external apparatus 250 is performed through the public network 200, and the communication between the external apparatus 250 and the service providing apparatus 300 is performed through the network 400.

First, in STEP D301, the MFP 100 captures a telephone line, and calls a fax number of a destination received by the input unit 108. Next, in STEP D302, the MFP 100 transmits a calling (CNG) signal representing that there will be fax transmission, to the external apparatus 250 corresponding to the destination. Then, in STEP D303, the external apparatus 250 of the destination transmits a non-standard facilities (NSF) signal and a digital identification signal (DIS) to the MFP 100 which is the calling party. In a case where the external apparatus 250 has the same configuration as that of the MFP 100, the external apparatus 250 declares that the external apparatus 250 can perform a reception process through a server (FIG. 8) (to be described below), in the NSF signal. The case where the external apparatus 250 has the same configuration as that of the MFP 100 is a case where the external apparatus 250 is capable of performing at least the reception process through a server (FIG. 8) (to be described below).

Next, in STEP D304, the MFP 100 transmits a non-standard signal (NSS) declaring transmission based on the MFP's distinctive function, to the external apparatus 250, thereby declaring that an electronic file will be transmitted to the external apparatus 250 through the service providing apparatus 300.

Next, in STEP D305, the MFP 100 transmits a training check frame (TCF) signal to the external apparatus 250. Them in STEP D306, the external apparatus 250 transmits a confirmation-to-receive (CFR) signal representing that the external apparatus 250 is ready for receiving, to the MFP 100.

Next, in STEP D307, the MFP 100 adds the access information to be used for acquiring the electronic file from the service providing apparatus 300, to a header of a first page of the low-resolution image data, thereby generating the transmission data. The transmission data will be described below in detail with reference to FIG. 6.

Next, the MFP 100 transmits the transmission data including the access information, to the external apparatus 250, in STEP D308, and transmits a post message to the external apparatus 250 in STEP D309. If receiving the transmission data and the post message, in STEP D310, the external apparatus 250 transmits a message confirmation (MCF) signal representing that the external apparatus 250 is ready to receive the next transmission data. Next, in STEP D311, the MFP 100 transmits a disconnection (DCN) signal such that the telephone line is disconnected. Then, in STEP D312, the external apparatus 250 prints the received transmission data.

In a case where the external apparatus 250 has the same configuration as that of the MFP 100 of the present embodiment, the external apparatus 250 also generates an electronic-file download request including the access information acquired from the transmission data, and transmits the electronic-file download request, to the service providing apparatus 300, in STEP D313. The electronic-file download request generated by the external apparatus 250 is an HTTP message using GetMethod. Since servers that perform communication based on HTTP generally support GetMethod, the external apparatus 250 can request the electronic file from the service providing apparatus 300, by using GetMethod, even without any program for handling the service providing apparatus 300.

Next, in STEP D314, the external apparatus 250 downloads (receives) the electronic file associated with the access information, that is, the album ID specified in the album URL, included in the transmitted electronic-file download request In a case where there is a plurality of electronic files associated with one album, the external apparatus 250 downloads all of those electronic files.

According to the MFP 100 of the present embodiment, it is possible to make the external apparatus 250 of the destination to acquire the electronic file including the high-resolution image data through the service providing apparatus 300. Therefore, it is possible to reduce the communication time and to reduce the cost of communication required for communication through the public network 200, as compared to a case where an electronic file is transmitted and received through the public network 200. Further, the user of the MFP 100 needs only to designate a fax number of a destination, like in general fax transmission, and thus it is possible to suppress workload on the user.

FIG. 4 is a flow chart illustrating a main process which is performed in the MFP 100. The main process is for performing fax transmission and reception, and is repeatedly performed after the MET 100 is activated.

First, in STEP S402, the CPU 101 determines whether any instruction for fax transmission through a server has been input by the user. If the result of the determination of STEP S402 is positive (Yes in STEP S402), in STEP S404, the CPU 101 performs the fax transmission process through the server.

Figure 5B:
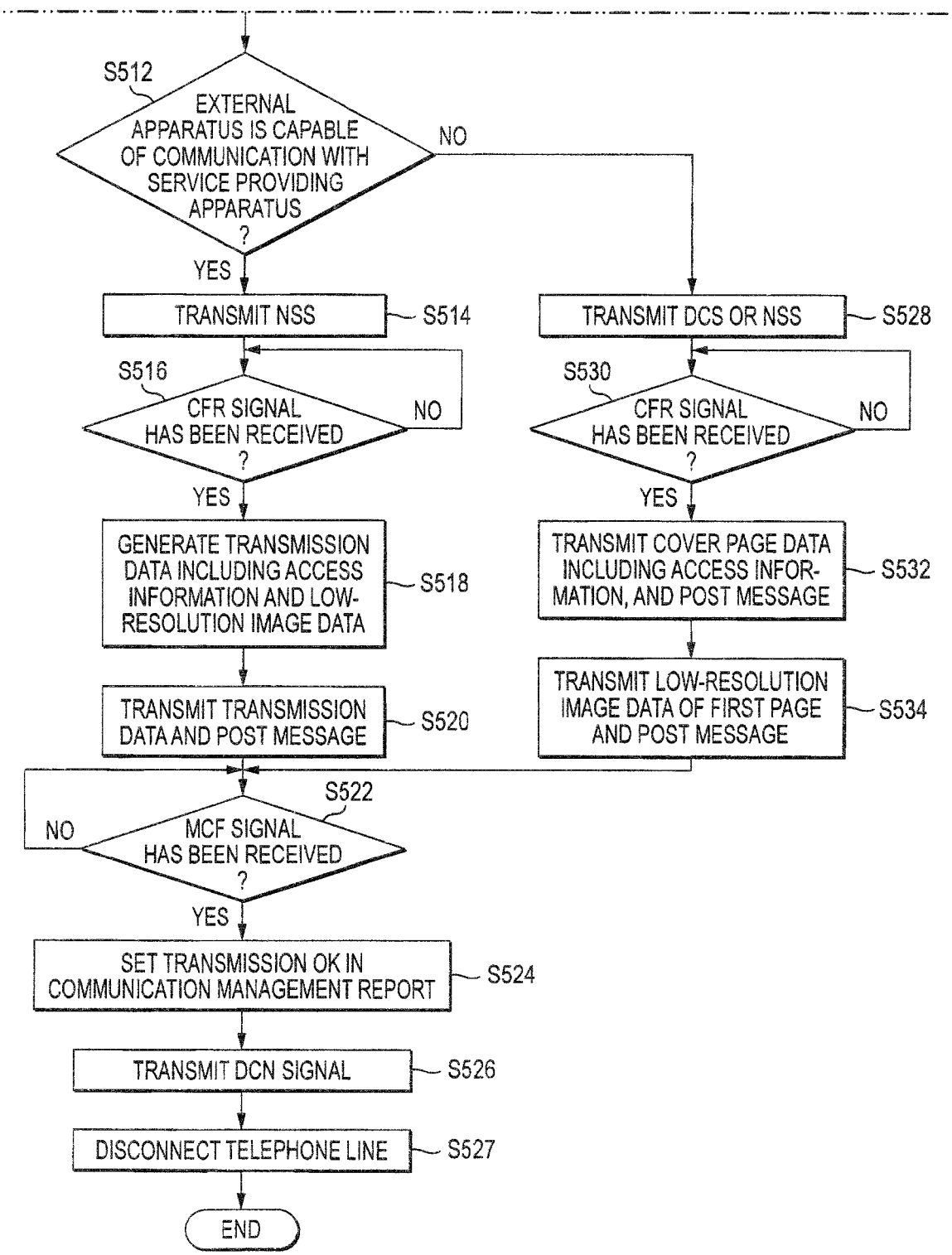

FIG. 5 is a flow chart illustrating the fax transmission process through the server which is performed in the MFP 100. The fax transmission process through the server is for uploading an electronic file generated based on a read document, to the service providing apparatus 300, and transmitting access information to be used for acquiring the electronic file, to the external apparatus 250 of the destination. It is assumed that, prior to start of the fax transmission process through the server, the user inputs a fax number of the destination from the input unit 108 so as to designate the destination.

First, in STEP S502, the CPU 101 reads a document at a high resolution by the scanner 107, so as to generate high-resolution image data based on the document, and stores the high-resolution image data in the RAM 103. Next, in STEP S504, the CPU 101 performs a resolution conversion process on the image data, generated based on a first page document, of the high-resolution image data, so as to generate low-resolution image data, and stores the low-resolution image data in the RAM 103. In other words, whenever document reading is performed once, high-resolution image data and low-resolution image data are generated.

Next, in STEP S506, the CPU 101 uploads the JPEG-format electronic file including the high-resolution image data to the service providing apparatus 300, such that the JPEG-format electronic file is stored in the service providing apparatus 300. Then, in STEP S507, the CPU 101 receives the access information to be used for acquiring the electronic file, from the service providing apparatus 300 through the relay 500, and stores the access information in the RAM 103. The process for storing the electronic file in the service providing apparatus 300, and the process for receiving the access information have been described in detail with reference to FIG. 2, and thus the redundant description will not be repeated.

Next, in STEP S508, the telephone line is captured, and the fax number of the destination is called. Subsequently, in STEP S509, the CNG signal is transmitted from the NCU 111. Then, until the NSF signal and the DIS are received (in a case of No in STEP S510), the CPU 101 stands by.

If the NSF signal and the DIS are received (Yes in STEP S510), in STEP S512, the CPU 101 determines whether the external apparatus 250 is capable of communication with the service providing apparatus 300. Specifically, it is determined whether it is declared in the NSF signal that the external apparatus 250 can perform the reception process through the server (FIG. 8) (to be described below).

In a case where it is determined that the external apparatus 250 is capable of communication with the service providing apparatus 300 (Yes in STEP S512), in STEP S514, the CPU 101 transmits the NSS for instructing the external apparatus 250 to perform the reception process through the server (FIG. 8), from the NCU Then, until the CFR signal is received (in a case of No in STEP S516), the CPU 101 stands by. If the CFR signal is received (Yes in STEP S516), in STEP S518, the CPU 101 generates the transmission data including the access information and the low-resolution image data.

Figure 6A:
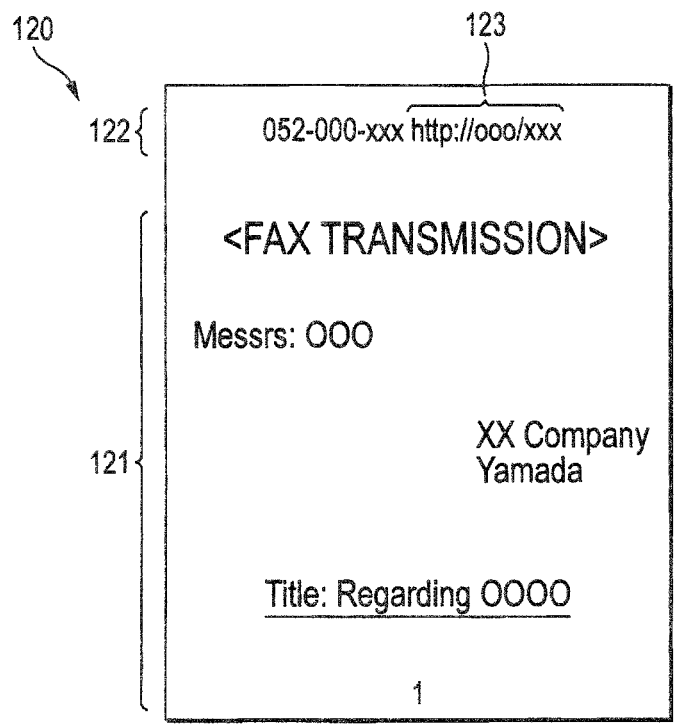
FIG. 6A is a view illustrating a structure of transmission data which is transmitted from the MFP to the external apparatus.

FIG. 6A is a view illustrating a structure of transmission data which is generated in STEP S518. As shown in FIG. 6A, transmission data 120 includes low-resolution image data 121 generated based on a first page document of a document read by the scanner 107, and transmission source information 122 added as a header of the low-resolution image data 121.

Since the image data 121 of the first page is included in the transmission data, it is possible to transmit information important in making a receiver of the external apparatus 250 of the destination grasp the contents such as a title and the destination. The transmission source information 122 may include the fax number of the MFP 100 of the transmission source, and transmission date and time, for instance. In the present embodiment, the transmission source information 122 may further include access information 123.

Referring to FIG. 5 again, a description will be made. Next, in STEP S520, the CPU 101 transmits the generated transmission data and the post message to the external apparatus 250 through the public network 200. Here, the transmission data includes the low-resolution image data, and has a smaller amount of data, as compared to the electronic file transmitted to the service providing apparatus 300. Therefore, it is possible to reduce the cost of communication, as compared to a case of transmitting the electronic file through the public network 200.

Also, the transmission data includes the low-resolution image data corresponding to the first page of the document. Therefore, even in a case of reading a plurality of documents by the scanner 107, it is possible to reduce the cost of communication.

Further, it is possible to make the receiver of the destination recognize at least a portion of the contents of the electronic file capable of being acquired based on the access information, by the low-resolution image data included in the transmission data. Therefore, for example, it is possible to avoid, for example, the trouble of having to transmit the contents of the electronic file to the receiver by a separate telephone or the like, and thus it is possible to suppress workload on the user.

Furthermore, since the access information and the low-resolution image data can be transmitted as transmission data of one page, it is possible to reduce the cost of communication, as compared to a case of transmitting the access information as data of one page and transmitting the low-resolution image data as data of one page.

Then, until the MCF signal is received from the external apparatus 250 in a case of No in STEP S522), the CPU 101 stands by, and if the MCF signal is received (Yes in STEP S522), in STEP S524, the CPU 101 sets transmission OK in a communication management report (not shown) stored in the flash memory 104. The communication management report is information which is printed or displayed for informing the user or the like about whether the fax transmission has been normally performed. Next, the CPU 101 transmits the DCN signal from the NCU 111, in STEP S526, and disconnects the telephone line in STEP S527. In other words, the fax transmission process through the server is finished by transmitting transmission data of one page, regardless of the number of pages of the read documents.

Meanwhile, in a case where it is not determined that the external apparatus 250 is capable of communication with the service providing apparatus 300 (No in STEP S512), specifically, in a case where it is not declared in the NSF signal that the external apparatus 250 can not perform the reception process through the server (FIG. 8) (to be described below), in STEP S528, the CPU 101 transmits a digital command signal (DCS) or a non-standard facilities set-up (NSS) signal from the NCU 111, thereby commanding the external apparatus 250 to perform TIC standard fax transmission (general fax transmission). More specifically, in a case where the external apparatus 250 is a product of a maker different from that of the MFP 100, the MFP 100 transmits the DCS for designating a facility selected from standard facilities represented in the DIS, to the external apparatus 250, and in a case where the external apparatus 250 is a product of the same maker as that of the MFP 100, the MFP 100 transmits the NSS, which does not command the reception process through the server, to the external apparatus 250.

Next, until the CFR signal is received (in a case of No in STEP S530), the CPU 101 stands by, and if the CFR signal is received (Yes in STEP S530), in STEP S532, the CPU 101 generates cover page data including the access information, and transmits the cover page data and the post message to the external apparatus 250. Then, in STEP S534, the CPU 101 transmits the low-resolution image data generated based on the first page document of the document read by the scanner 107, and the post message, to the external apparatus 250.

Figure 6B:
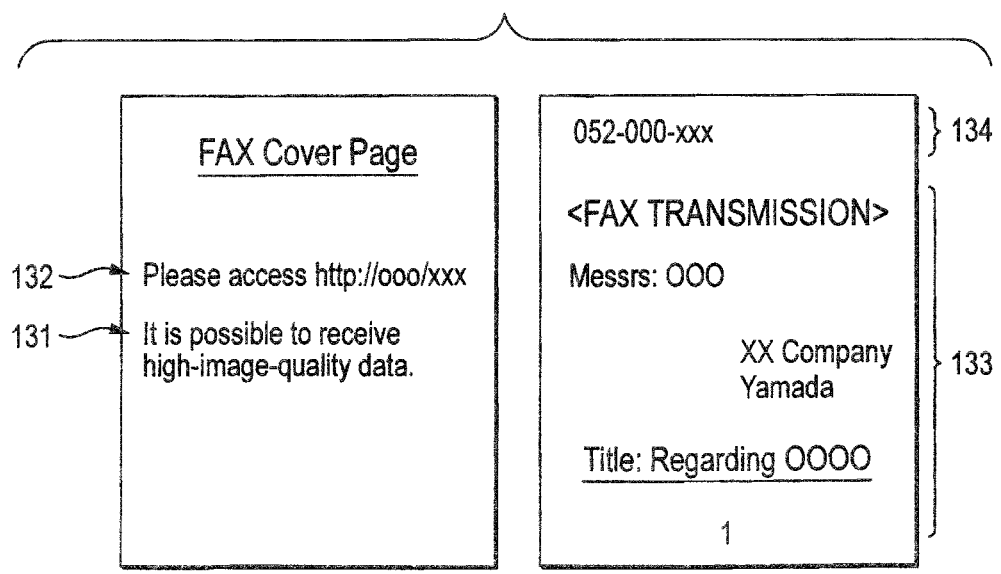
FIG. 6B is a view illustrating a structure of cover page data which is transmitted from the MFP to the external apparatus.

FIG. 6B is a view illustrating a structure of cover page data which is transmitted in STEP S532, and a structure of image data which is transmitted in STEP S534. As shown in FIG. 6B, the cover page data is data obtained by including access information 132 in fixed-format format image data 131 stored in the ROM 102 or the like. This cover page data is printed in the external apparatus 250 of the destination, such that the access information 132 is visibly output in the external apparatus 250. Thus, for example, even in a case where the external apparatus 250 of the destination is different from the MFP 100 and is not capable of communication of the service providing apparatus 300, it is possible to make the receiver easily visibly recognize the access information. Therefore, the receiver of the destination can access the service providing apparatus 300 from a separate apparatus, by using the access information, and perform appropriate handling, such as acquiring of the electronic file. Further, for example, although the external apparatus 250 of the destination is different from the MFP 100 and thus cannot perform the reception process through the server (FIG. 8) (to be described below), in a case where the external apparatus 250 can access the service providing apparatus 300, it is possible to acquire the electronic file from the external apparatus 250, by using the visibly output access information.

Also, it is preferable to include a message, which represents that it is possible to acquire the electronic file from the service providing apparatus 300 by using the access information 132, in the fixed-format image data 131. In this case, it is possible to more reliably make the receiver acquire the electronic file.

Also, as shown in FIG. 6B, it is preferable that low-resolution image data 133 which is transmitted in STEP S534 should be image data corresponding to the first page of the read document. In this case, the receiver easily grasps what contents an acquirable electronic file has, based on the access information described in a cover page. The low-resolution image data 133 includes transmission source information 134 added thereto and including the fax number of the MFP 100 of the transmission source. The transmission source information 134 may not include any access information.

Referring to FIG. 5 again, a description will be made. After the cover page data and the image data of one page are transmitted, the CPU 101 proceeds to STEP S522. STEP S522 to STEP S527 have been described above in detail, and thus the redundant description will not be repeated.

According to the fax transmission process through the server of STEP S404, it is possible to transmit appropriate data to the external apparatus 250 in accordance with whether the external apparatus 250 corresponding to the destination is capable of communication with the service providing apparatus 300.

Referring to FIG. 4 again, a description will be made. In a case where it is not determined that any instruction for the fax transmission through the server has been input by the user (No in STEP S402), in STEP S408, the CPU 101 determines whether any instruction for the general fax transmission has been input by the user. In a case where the result of the determination of the STEP S408 is positive (Yes in STEP S408), in STEP S412, the CPU 101 performs a general fax transmission process. This process is a process which generates low-resolution image data from the image data of the document read by the scanner 107, and transmits the low-resolution image data to the external apparatus 250 corresponding to the destination designated in advance. Since the general fax transmission process is a known process, the general fax transmission process will not be described in detail.

In a case where it is not determined that any instruction for the general fax transmission has been input (No in STEP S408), in STEP S414, the CPU 101 determines whether to start fax reception. Specifically, in a case where the MFP 100 is called by the external apparatus 250 (Yes in STEP S414), in STEP S416, the fax reception process is performed.

Figure 7:
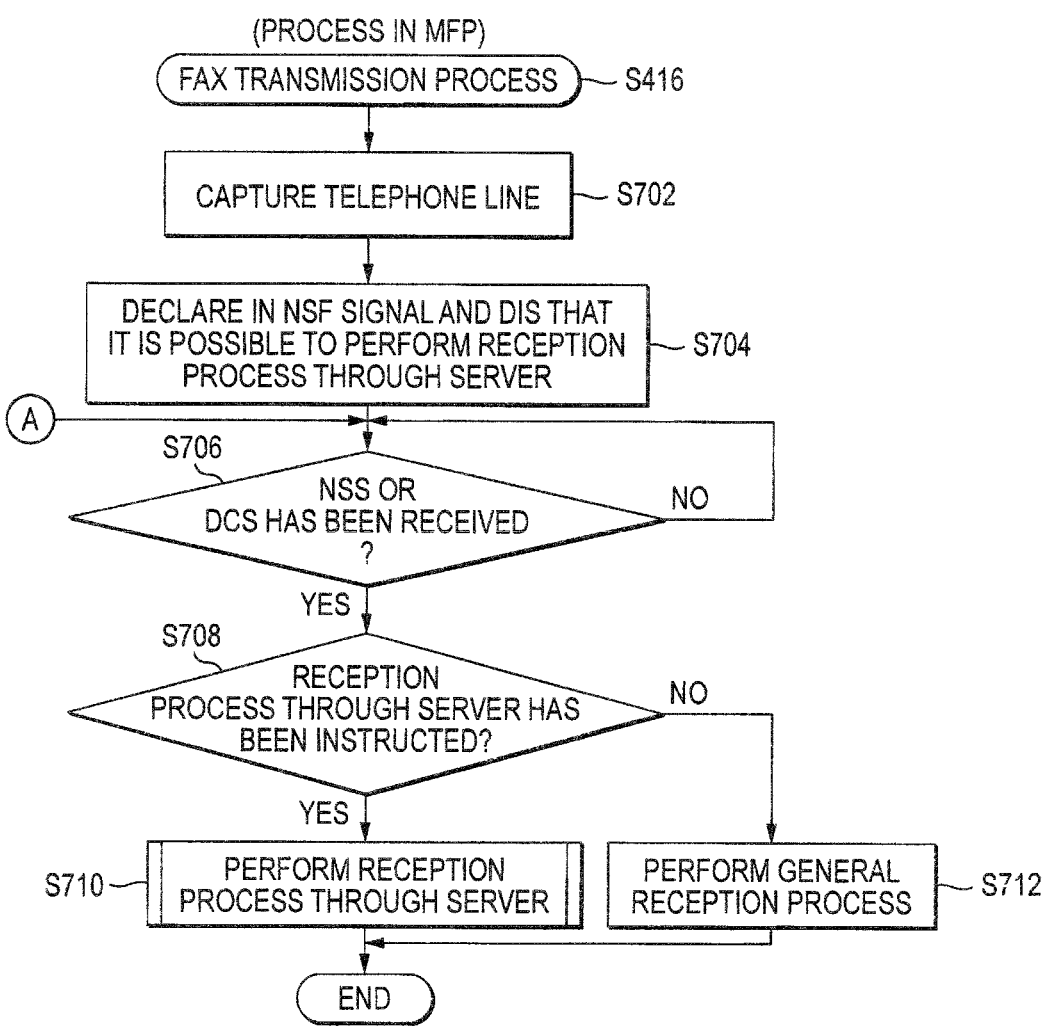
FIG. 7 is a flow chart illustrating a fax reception process which is performed in the MFP.

FIG. 7 is a flow chart illustrating the fax reception process which is performed in the MFP 100. In the fax reception process, after the telephone line is captured in STEP S702, the CPU 101 transmits the NSF signal and the DIS from the NCU ill to the external apparatus 250 of the calling party. Therefore, since the MFP 100 is capable of communication with the service providing apparatus 300, in STEP S704, it is declared that it is possible to perform the reception process through the server (FIG. 8) (to be described below). Specifically, in STEP S704, an NSF signal which includes information representing that the MFP 100 is capable of communication with the service providing apparatus 300 and thus can perform the reception process through the server (FIG. 8) (to be described below) is transmitted.

Next, until the NSS or the DCS is received (in a case of No in STEP S706), the CPU 101 stands by, and if the NSS or the DCS is received (Yes in STEP S706), in STEP S708, it is determined whether performing of the reception process through the server (FIG. 8) has been instructed. This is because, in a case where the external apparatus 250 of the calling party has the same configuration as that of the MFP 100, the external apparatus 250 instructs the MFP 100 of the called party to perform the reception process through the server, by the NSS.

In a case where performing of the reception process through the server has been instructed (Yes in STEP S708), that is, in a case where it is determined the transmission data transmitted from the external apparatus 250 includes access information, the CPU 101 performs the reception process through the server, in STEP S710, and finishes the fax reception process. The reception process through the server will be described below with reference to FIG. 8. Meanwhile, in a case where processing of the reception process through the server has not been instructed (No in STEP S708), the CPU 101 performs a general reception process in STEP S712, and finishes the fax reception process. The general reception process is a process which receives image data from the external apparatus 250, and prints the image data. Since the general reception process is a known process, the general reception process will not be described in detail.

Figure 8:
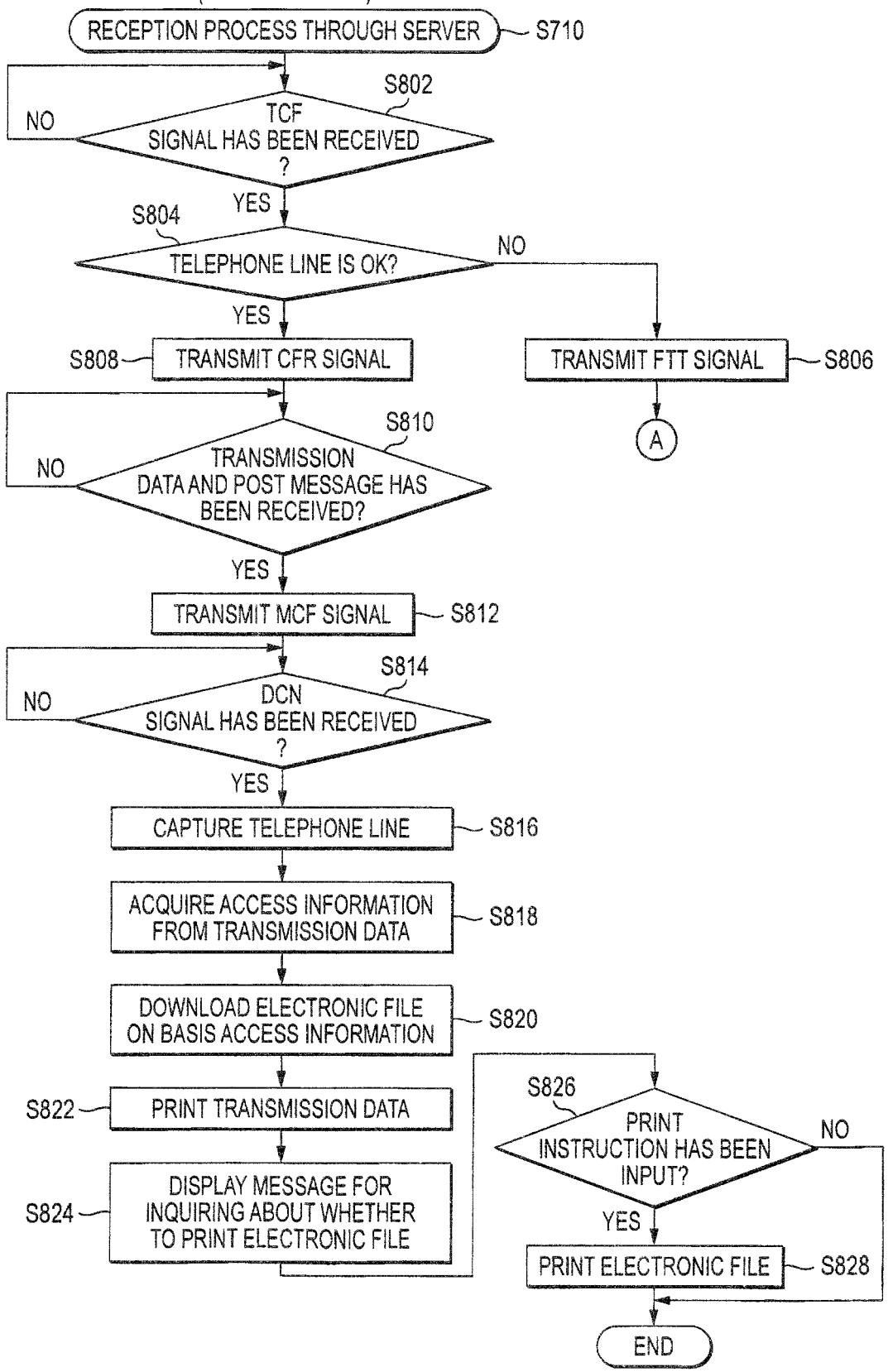
FIG. 8 is a flow chart illustrating a reception process through a server, which is performed in the MFP.

FIG. 8 is a flow chart illustrating the reception process through the server which is performed in the MFP 100. First, until the TCF signal is received (in a case of No in STEP S802), the CPU 101 stands by, and if the TCF signal is received (Yes in STEP S802), in STEP S804, the CPU 101 determines whether a result of checking on the telephone line is OK or not. In a case where the telephone line is not OK (No in STEP S804), in STEP S806, the CPU 101 transmits a failure-to-train (FTT) signal, thereby demanding retraining of the external apparatus 250 of the calling party. Then, the CPU 101 returns to the process of STEP S706. If receiving the FTT signal, the external apparatus 250 of the calling party retransmits the TCF signal at a reduced transmission rate. This is a known process, and thus will not be described in detail.

Meanwhile, in a case where the result of the checking on the telephone line is OK (Yes in STEP S804), in STEP S808, the CPU 101 transmits the CFR signal from the NCU 111. Then, in STEP S810, the CPU 101 determines whether the transmission data and the post message have been received from the external apparatus 250.

In a case where a result of the determination of STEP S810 is negative (No in STEP S810), the CPU 101 stands by. The transmission data which is received in STEP S810 is data which includes the transmission source information 122 including the access information 123 and added as the header of the low-resolution image data 121 thereto, and the low-resolution image data 121 of one page, as described, with reference to FIG. 6A. In a case where the transmission data and the post message have been received (Yes in STEP S810), in STEP S812, the CPU 101 transmits the MCF signal from the NCU 111. Then, until the DCN signal is received (in a case of No in STEP S814), the CPU 101 stands by. If the DCN signal is received (Yes in STEP S814), in STEP S816, the CPU 101 makes the NCU 111 capture the telephone line.

Then, in STEP S818, the CPU 101 acquires the access information from the transmission data. Specifically, the transmission source information 122 (FIG. 6A) added as the header of the transmission data is read by an automatic character recognition process, thereby extracting the access information 123, and the access information 123 is stored, in the RAM 103. In this case, it is possible to acquire the access information 123 only by reading the transmission source information 122 having a relatively small number of characters. Therefore, it is possible to easily acquire the access information 123.

Next, the CPU 101 generates an electronic-file download request including the access information acquired from the transmission data, and transmits the electronic-file download request to the network 400 through the Internet I/F 105. In response to this, in STEP S820, the CPU 101 downloads the electronic file from the service providing apparatus 300 through the Internet I/F 105, and stores the electronic file, for example, in the flash memory 104.

Next, in STEP S822, the CPU 101 prints the transmission data by the printer 106. In other words, the CPU 101 prints the image data of one page obtained by including the access information 123 in the transmission source information 122. In this case, from the print result, the user can grasp the contents on what electronic file has been acquired from the service providing apparatus 300, and see the access information for acquiring the electronic file.

Next, in STEP S824, the CPU 101 displays a message for inquiring of the user about whether to print the electronic file, on the LCD 109. Then, in STEP S826, the CPU 101 determines whether the user has input any electronic-file print instruction. In a case where a result of the determination of STEP S826 is negative (No in STEP S826), the CPU 101 finishes the reception process through the server. Meanwhile, in a case where the user has input an electronic-file print instruction (Yes in STEP S826), in STEP S828, the CPU 101 prints the electronic file by the printer 106. Therefore, the user can acquire a high-resolution print result.

According to the reception process through the server shown in FIG. 8, the electronic file is received from the service providing apparatus 300, based on the access information included in the transmission data received from the external apparatus 250 through the public network 200. Therefore, it is possible to save the transmitter the trouble of having to transmit separate access information to the receiver by a telephone or the like, and thus it is possible to suppress workload on the user.

Further, it is determined whether performing of the reception process through the server has been instructed from the external apparatus 250 of the calling party, and if it is determined that performing of the reception process through the server has been instructed, the access information is acquired from the transmission source information added as the header of the image data. Therefore, it is possible to reliably acquire the access information, and receive the electronic file based on the access information.

Referring to FIG. 4 again, a description will be made. In a case where it is not determined that it is required to start the fax reception (No in STEP S414), in STEP S418, the CPU 101 determines whether any electronic-file acquisition instruction has been input by the user. In a case where a result of the determination of STEP S418 is positive (Yes in STEP S418), in STEP S420, the CPU 101 receives an input of the access information by the input unit 108. Specifically, the CPU 101 displays a message for prompting an input of the access information, and an input box for the access information, on the LCD 109. Meanwhile, when the input box for the access information is being displayed, the user on the reception side manipulates the input unit 108 to input access information corresponding to a desired electronic file to the MFP 100 while seeing the access information included in the transmission source information of the printed transmission data.

Next, in STEP S422, the CPU 101 generates an electronic-file download request including the received access information and transmits the electronic-file download request to the network 400, downloads the electronic file from the service providing apparatus 300 in response to the electronic-file download request, and stores the electronic file, for example, in the flash memory 104.

Therefore, it is possible to acquire the electronic file at a timing that is convenient for the user. For example, in a case of losing the electronic file downloaded from the service providing apparatus 300, the user can input the access information included in the transmission source information of the printed transmission data, thereby receiving the electronic file again.

In a case where it is not determined that any electronic-file acquisition instruction has been input (No in STEP S418), in STEP S424, the CPU 101 performs another process. For example, in a case where an electronic-file print instruction has been input, the CPU 101 prints the electronic file. Therefore, the user can acquire a high-resolution print result at a desired timing. Next, in STEP S406, the CPU 101 determines whether the power is off. Then, in a case where a result of the determination of STEP S406 is negative (No in STEP S406), the CPU 101 repeats the process of STEP S402 and the subsequent processes, and if the power is off (Yes in STEP S406), the CPU 101 finishes the main process.

Although the present invention has been described above based on the embodiment, it is easily inferable that the present invention is not limited to the above-mentioned embodiment, but may be variously modified for improvement without departing from the scope of the invention.

For example, in the above-mentioned embodiment, in the case where it is determined that the external apparatus 250 is not capable of communication with the service providing apparatus 300 (No in STEP S512), the cover page data and the low-resolution image data of one page are transmitted from the 100 to the external apparatus 250. Alternatively, in order to generate image data to be transmitted to the external apparatus 250 designated as the destination, low-resolution image data may be generated with respect to all pages of the document read by the scanner 107, and be transmitted to the external apparatus 250.

Figure 9B:
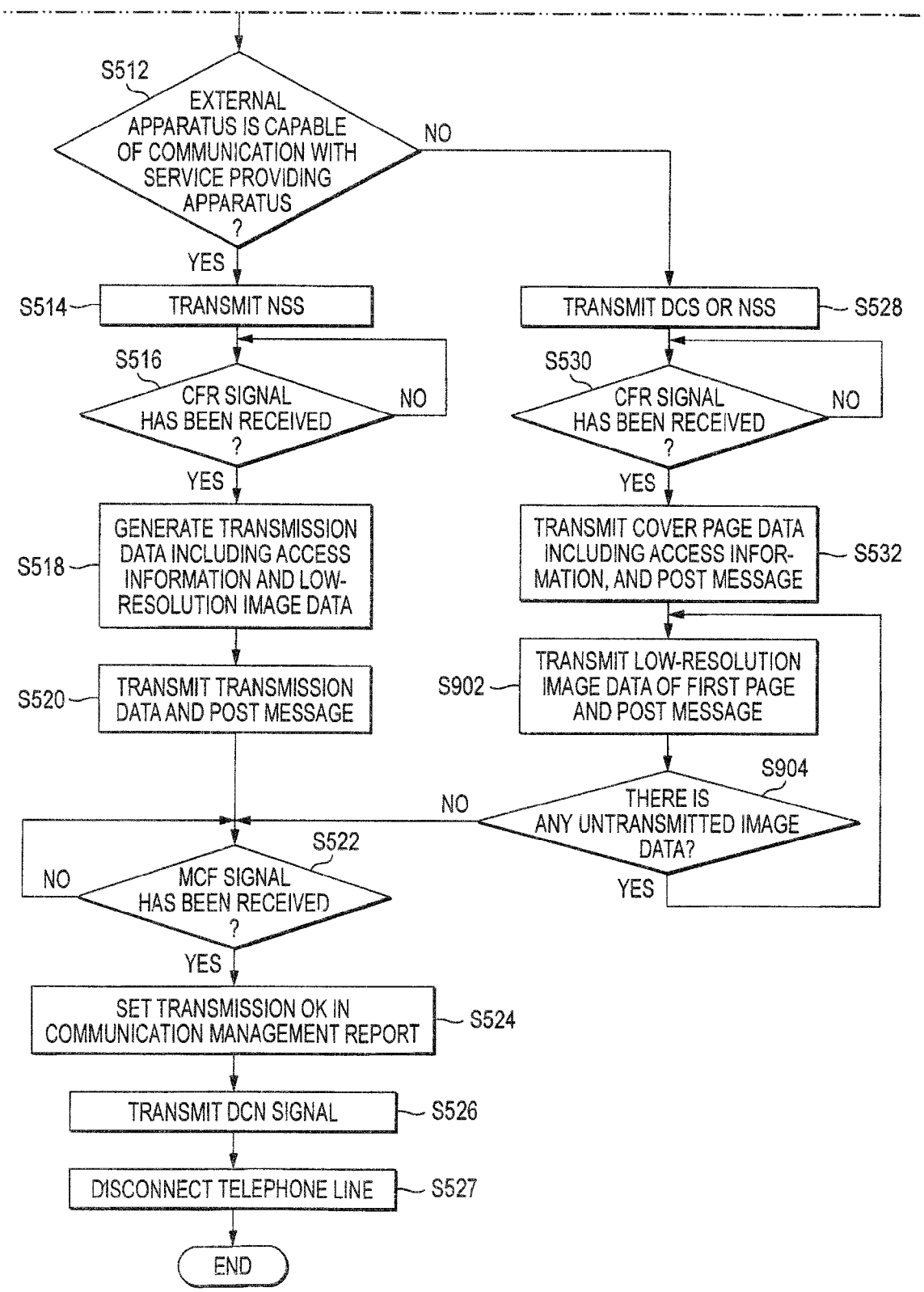

FIG. 9 is a flow chart illustrating a fax transmission process through a server (STEP S404) according to a modification which is performed in the MFP 100. Among individual steps shown in FIG. 9, identical steps to those included in the fax transmission process through the server (FIG. 5) described in the embodiment are denoted by the same reference symbols, and the redundant description will not be repeated.

In the fax transmission process through the server according to the modification, in STEP S502, high-resolution image data is generated with respect to all pages of the document read as a document to be subject to fax transmission to the external apparatus 250 by the scanner 107, and in STEP S901, low-resolution image data is generated based on the all pages, and is stored in the RAM 103.

Then, in a case where it is determined that the external apparatus 250 is not capable of communication with the service providing apparatus 300 (No in STEP S512), in STEP S532, the CPU 101 generates cover page data and transmits the cover page data and the post message to the external apparatus 250. Next, in STEP S902, the CPU 101 transmits the low-resolution image data of the first page and the post message to the external apparatus 250 of the destination. Subsequently, in STEP S904, the CPU 101 determines whether there is any untransmitted image data. If a result of the determination of STEP S904 is positive (Yes in STEP S904), the CPU 101 repeats the processes of STEP S902 and STEP S904. In a case where it is determined that there is no untransmitted low-resolution image data (No in STEP S904), the CPU 101 proceeds to the process of STEP S522.

According to this modification, in a case where it is not determined that the external apparatus 250 is capable of communication with the service providing apparatus 300, since the low-resolution image data corresponding to all pages of the documents is transmitted, it is possible to make the user of the destination recognize all the contents of the documents.

Further, according to the modification, similarly to the above-mentioned embodiment, the cover page data including the access information to be visibly output in the external apparatus 250 is transmitted to the external apparatus 250. Therefore, the user can use an apparatus other than the external apparatus 250, for example, a personal computer, to acquire the electronic file based on the access information.

In the above-mentioned embodiment, with respect to whether to acquire the electronic file, the intention of the user is not confirmed. However, only in a case where the user wants the electronic file, the electronic file may be acquired.

Figure 10:
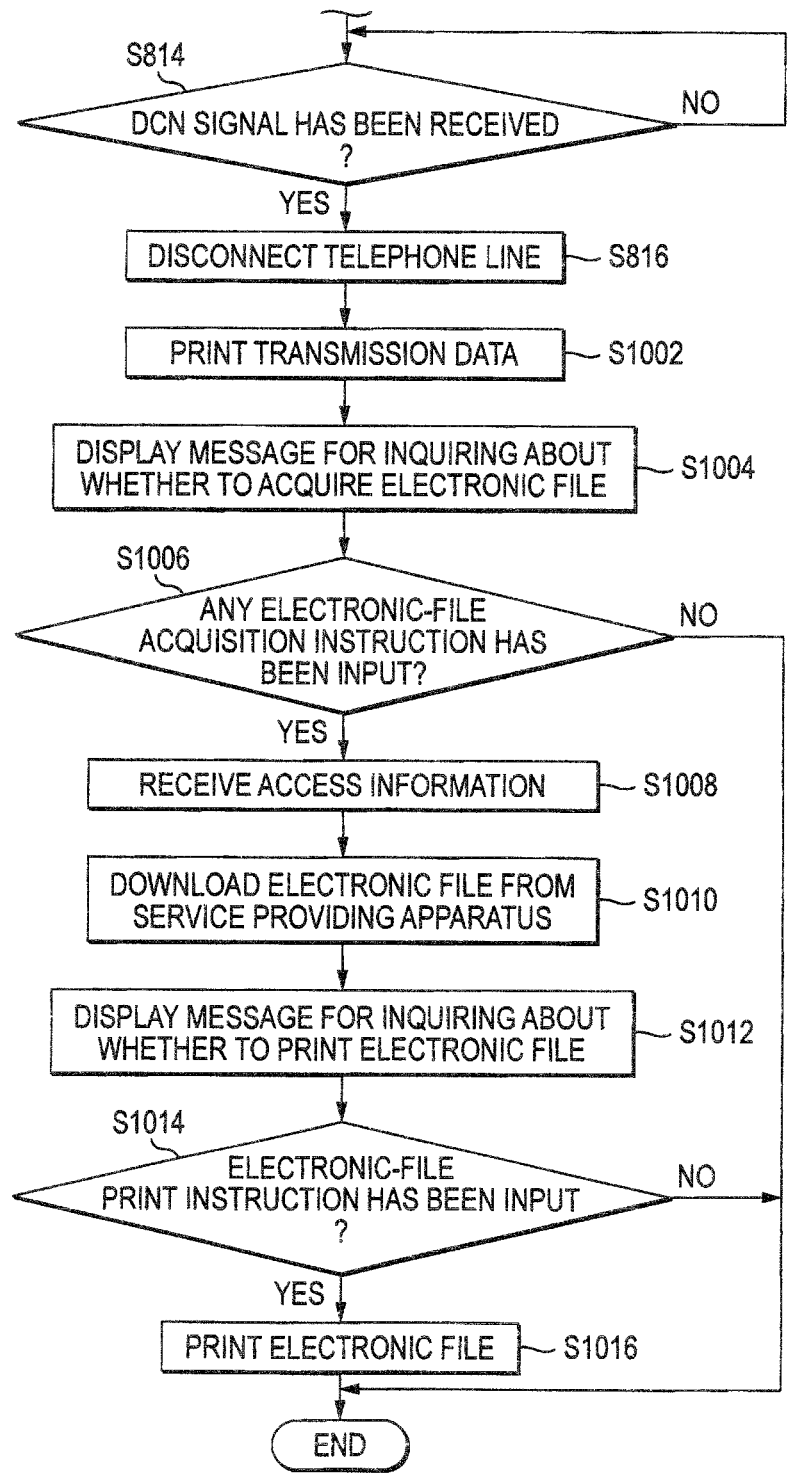
FIG. 10 is a flow chart illustrating a reception process through a server according to the modification.

FIG. 10 is a flow chart illustrating a reception process through a server according to the modification which is performed in the MFP 100. The reception process through the server shown in FIG. 10 includes identical steps to STEP S802 to STEP S812 included in the reception process through the server (FIG. 8) according to the embodiment, and thus STEP S802 to STEP S812 are not shown and will not be described.

In the reception process through the server according to the modification shown in FIG. 10, after the telephone line is disconnected in STEP S816, in STEP S1002, the CPU 101 prints the transmission data by the printer 106. In other words, the CPU 101 prints image data of one page obtained by including the access information 123 in the transmission source information 122. Next, in STEP S1004, the CPU 101 displays a message for inquiring of the user about whether to acquire the electronic file, on the LCD 109, and in STEP S1006, the CPU 101 determines whether any electronic-file acquisition instruction has been input by the user. In a case where any electronic-file acquisition instruction has not been input (No in STEP S1006), the CPU 101 finishes the reception process through the server.

Meanwhile, in a case where an electronic-file acquisition instruction has been input (Yes in STEP S1006), in STEP S1008, the CPU 101 receives an input of the access information by the input unit 108. The user manipulates the input unit 108 to input the access information corresponding to the desired electronic file to the MFP 100 while seeing the access information included in the transmission source information of the printed transmission data.

Next, in STEP S1010, the CPU 101 downloads the electronic file from the service providing apparatus 300 based on the received access information, and stores the electronic file, for example, in the flash memory 104. Next, in STEP S1012, the CPU 101 displays a message for inquiring of the user about whether to print the electronic file, and in STEP S1014, the CPU 101 determines whether the user has input any electronic-file print instruction. In a case where a result of the determination of STEP S1014 is negative (No in STEP S1014), the CPU 101 finishes the reception process through the server. Meanwhile, in a case where the user has input an electronic-file print instruction (Yes in STEP S1014), the CPU 101 prints the electronic file by printer 106 in STEP S1016, and finishes the reception process through the server. According to the modification, it is possible to acquire the electronic file only when the user wants the electronic file.

The modification shown in FIG. 10 may be further modified such hat, in STEP S1008, the access information is automatically read from the header of the transmission data, and in STEP S1010, the electronic file is downloaded based on the automatically read access information.

Also, the modification shown in FIG. 10 may be further modified such that any electronic file downloaded, in STEP S1010 is always printed with STEP S1012 and STEP S1014 removed.

In the above-mentioned embodiment, the high-resolution image data is an example of first image data, and the low-resolution image data is an example of second image data or low-grade image data. However, the first image data, the second image data, and the low-grade image data are not limited thereto. For example, in a case where the scanner 107 is configured to be capable of reading color documents, color image data may be an example of the first image data, and monochromatic image data obtained by performing a conversion process on the first image data may be an example of the second image data or the low-grade image data.

In a case where a plurality of documents is read by the scanner 107, image data of a plurality of data items corresponding to the plurality of documents may be the first image data, and image data corresponding to one document of the plurality of documents may be the second image data.

The present invention can also be applied to a case where the MFP 100 directly uses the service providing apparatus 300 without intervention of the relay 500.

Also, regardless of whether the external apparatus 250 of the destination is capable of communication with the service providing apparatus 300, the low-resolution image data regarding all pages of the document read by the scanner 107 may be included in the transmission data, and be transmitted from the MFP 100 to the external apparatus 250.

Further, the MFP 100 serving as the calling party apparatus may configure the transmission data to be transmitted through the public network 200, for example, in a JPEG-format electronic file. In this case, access information may be included in header information added as the header of the electronic file, and be transmitted. Meanwhile, the MFP 100 serving as the called party apparatus may analyze the header information of the electronic file received through the public network 200, thereby acquiring the access information from the header information.

In the above-mentioned embodiment, the access information is the URL received from the service providing apparatus 300. However, the access information may be other information, such as a user ID or a password, which can be used for receiving data from the service providing apparatus 300.

In the above-mentioned embodiment, the low-resolution image data generated based on the document and the access information are included in the transmission data, and are transmitted. However, instead of the low-resolution image data, for example, high-resolution image data generated based on the fixed-format cover page data, the transmission report, and the first page document may be included in the transmission data, together with the access information.

In the above-mentioned embodiment, in a case where the MFP 100 serving as the called party apparatus is instructed to perform the reception process through the server by the NSS received from the external apparatus 250 (Yes in STEP S708), it is determined that the transmission data transmitted from the external apparatus 250 includes the access information. In order to determine whether the transmission data includes the access information, a specific section of the received transmission data may be analyzed.

In the above-mentioned embodiment, the MFP 100 of the calling party prints the transmission data received from the external apparatus 250 of the calling party, and the electronic file received from the service providing apparatus 300. Alternatively, for example, the MFP 100 may display the transmission data and the electronic file on the LCD 109, or output the transmission data and the electronic file to another apparatus or a memory card (not shown).

Also, if receiving the electronic file from the service providing apparatus 300, the MFP 100 of the calling party may transmit an erase request for requesting to erase the electronic file to the service provider to the service providing apparatus 300, through the relay 500 or directly.

According to an image communication apparatus of a first aspect, transmission data including access information for acquiring first image data from a server, and second image data having a smaller amount of data than that of the first image data is transmitted to a destination received by a destination receiving unit, through a public network. Therefore, it is possible to reduce the cost of communication required for communication through the public network, as compared to a case of transmitting the first image data through the public network. Further, the user needs only to designate the transmission data to be transmitted through the public network, and thus it is possible to suppress workload on a user.

According to the image communication apparatus, the access information can be included in additional information added as a header of the second image data, and be transmitted. Therefore, it is possible to reduce the cost of communication, as compared to a case of transmitting the access information as transmission data of one page and transmitting the second image data as transmission data of one page.

According to the image communication apparatus, second image data having a grade lower than that of the first image data, generated based on the document read by the reading unit, may be included in the transmission data and be transmitted to the destination. Therefore, it is possible to reduce the cost of communication required for communication through the public network, as compared to the case of transmitting the first image data through the public network. Further, it is possible to make a receiver of the destination recognize at least a portion of the contents of the first image data, be capable of being acquired by the access information, by the second image data, while transmitting the access information to the destination. Therefore, it is possible to avoid, for example, the trouble of having to transmit the contents of the first image data to the receiver by a separate telephone or the like, and thus to suppress workload on the user.

According to the image communication apparatus, the second image data generated based on one page of the document read by the reading unit may be included in the transmission data and be transmitted to the destination. Therefore, even when a plurality of documents is read, it is possible to suppress the cost of communication required for communication through the public network. Further, it is possible to make the receiver of the destination recognize at least a portion of the contents of the first image data, be capable of being acquired by the access information, by the second image data, while transmitting the access information to the destination. Therefore, it is possible to, for example, the trouble of having to transmit the contents of the first image data, to the receiver by a separate telephone or the like, and thus to suppress workload on the user.

According to the image communication apparatus, it is possible to transmit appropriate data to the external apparatus in accordance with whether the external apparatus corresponding to the destination is capable of communication with the server, and thus to reliably transmit information which should be transmitted, to the receiver of the destination. In other words, in a case where it is not determined that the external apparatus is capable of communication with the server, low-grade image data generated based on all pages of the document may be transmitted to the destination. Therefore, even when the external apparatus corresponding to the destination cannot acquire the first image data, it is possible to make the receiver of the destination recognize the contents of the first image data by the low-grade image data. Meanwhile, in a case where the external apparatus is capable of communication with the server, the transmission data generated by the transmission-data generating unit is transmitted. Therefore, it is possible to reduce the cost of communication.

According to the image communication apparatus, even when it is not determined that the external apparatus corresponding to the destination is capable of communication with the server, it is possible to make the receiver of the destination visibly recognize the access information by third image data including the access information to be visibly output in the external apparatus. The receiver of the destination can access the server from a separate apparatus by using the access information, and perform appropriate handling, such as acquiring of the first image data.

According to the image communication apparatus, it is possible to transmit appropriate data to the external apparatus in accordance with whether the external apparatus corresponding to the destination is capable of communication with the server. In other words, in a case where it is not determined that the external apparatus corresponding to the destination is capable of communication with the server, it is possible to make the receiver of the destination visibly recognize the access information by fourth image data including the access information to be visibly output in the external apparatus. Meanwhile, in the case where the external apparatus is capable of communication with the server, the transmission data generated by the transmission-data generating unit is transmitted. Therefore, it is possible to reduce the cost of communication.

According to the image communication apparatus, the first image data is received from the server based on the access information included in the transmission data received from the external apparatus through the public network. Therefore, it is possible to save the receiver the trouble of having to inquire of the transmitter about separate access information by a separate telephone or the like, and thus to suppress workload on the user.

According to the image communication apparatus, in a case where the access information is included in the transmission data, it is possible to reliably acquire the access information and to receive the first image data based on the access information.

According to the image communication apparatus, the access information may be acquired from the additional information added as a header of the image data. Therefore, it is possible to easily acquire the access information.

According to the image communication apparatus, the first image data may be received from the server based on input access information. Therefore, it is possible to acquire the first image data at a timing when is convenient for the user.

What is claimed is:

1. An image communication apparatus configured to communicate with a server on a computer network, and configured to communicate with at least one external apparatus through a public network, the image communication apparatus comprising:
- a reading unit configured to read a document;
- a processor;
- a memory storing instructions, when executed by the processor, causing the apparatus to:
  - receive a designation of a destination;
  - generate first image data based on the document read by the reading unit;
  - generate transmission data including access information and second image data having a smaller amount of data than that of the first image data, the access information being for acquiring the first image data from the server,
- a computer network interface configured to transmit the first image data to the server; and
- a modem configured to perform a facsimile transmission through the public network to transmit the transmission data to the destination;
- wherein the instructions further cause the apparatus to:
  - determine whether the external apparatus corresponding to the destination is capable of communication with the server; and
  - transmit low-grade image data, having a grade lower than that of the first image data, of image data generated based on all pages of the document read by the reading unit, to the destination if the external apparatus is not capable of communication with the server,
- wherein, if the external apparatus is capable of communication with the server, transmit the transmission data to the destination.

2. The image communication apparatus according to claim 1, wherein the transmission data includes the second image data, and additional information that is added as a header of the second image data and includes the access information.

3. The image communication apparatus according to claim 1, wherein the instructions further cause the apparatus to generate the second image data having a grade lower than that of the first image data, based on the document read by the reading unit.

4. The image communication apparatus according to claim 1, wherein the instructions further cause the apparatus to generate the transmission data including the second image data generated based on one page of the document read by the reading unit and the access information.

5. The image communication apparatus according to of claim 1, wherein the instructions further cause the apparatus to, if the external apparatus is not capable of communication with the server, transmit third image data including the access information to be visibly output in the external apparatus and the low-grade image data, to the destination.

6. The image communication apparatus according to claim 1 further comprising:
- a second receiving unit configured to receive the transmission data from the external apparatus through the public network;
- a first receiving unit configured to receive the first image data from the server, based on the access information included in the transmission data received by the second receiving unit; and
- a first output unit configured to output the first image data received by the first receiving unit.

7. The image communication apparatus according to claim 6 further comprising:
- an access-information determination unit configured to determine whether the transmission data received by the second receiving unit includes the access information; and
- an access-information acquiring unit configured to acquire the access information from the transmission data if the access-information determination unit determines that the transmission data received by the second receiving unit includes the access information,
- wherein the first receiving unit receives the first image data from the server based on the access information acquired by the access-information acquiring unit.

8. The image communication apparatus according to claim 7, wherein
- the second receiving unit receives the transmission data including the second image data and the additional information added as the header information of the second image data, from the external apparatus through the public network, the additional information including the access information, and
- the access-information acquiring unit acquires the access information from the additional information.

9. The image communication apparatus according to claim 6, further comprising:
- an access-information output unit configured to output at least the access information of the transmission data received by the second receiving unit; and
- an access-information receiving unit configured to receive an input of the access information included in the transmission data,
- wherein the first receiving unit receives the first image data from the server, based on the access information received by the access-information receiving unit.

10. An image communication apparatus configured to communicate with a server on a computer network, and configured to communicate with at least one external apparatus through a public network, the image communication apparatus comprising:
- a reading unit configured to read a document;
- a processor;
- a memory storing instructions, when executed by the processor, causing the apparatus to:
  - receive a designation of a destination;
  - generate first image data based on the document read by the reading unit;
  - generate transmission data including access information and second image data having a smaller amount of data than that of the first image data, the access information being for acquiring the first image data from the server,
- a computer network interface configured to transmit the first image data to the server; and
- a modem configured to perform a facsimile transmission through the public network to transmit the transmission data to the destination;
- wherein the instructions further cause the apparatus to:
- determine whether the external apparatus corresponding to the received destination is capable of communication with the server; and
- transmit fourth image data including the access information to be visibly output in the external apparatus to the received destination if the external apparatus is not capable of communication with the server,
- wherein, if the external apparatus is capable of communication with the server, transmit the generated transmission data to the received destination.

* * * * *